Aug. 8, 1950   J. R. ORELIND   2,518,363
POWER LIFT DEVICE FOR IMPLEMENTS
Filed Oct. 5, 1946
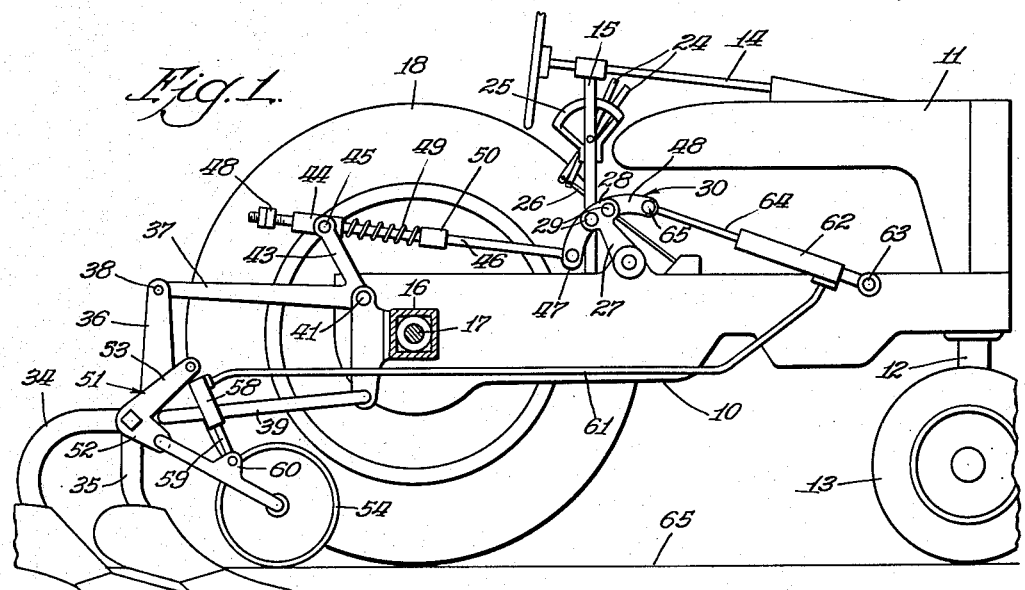
Fig. 1.
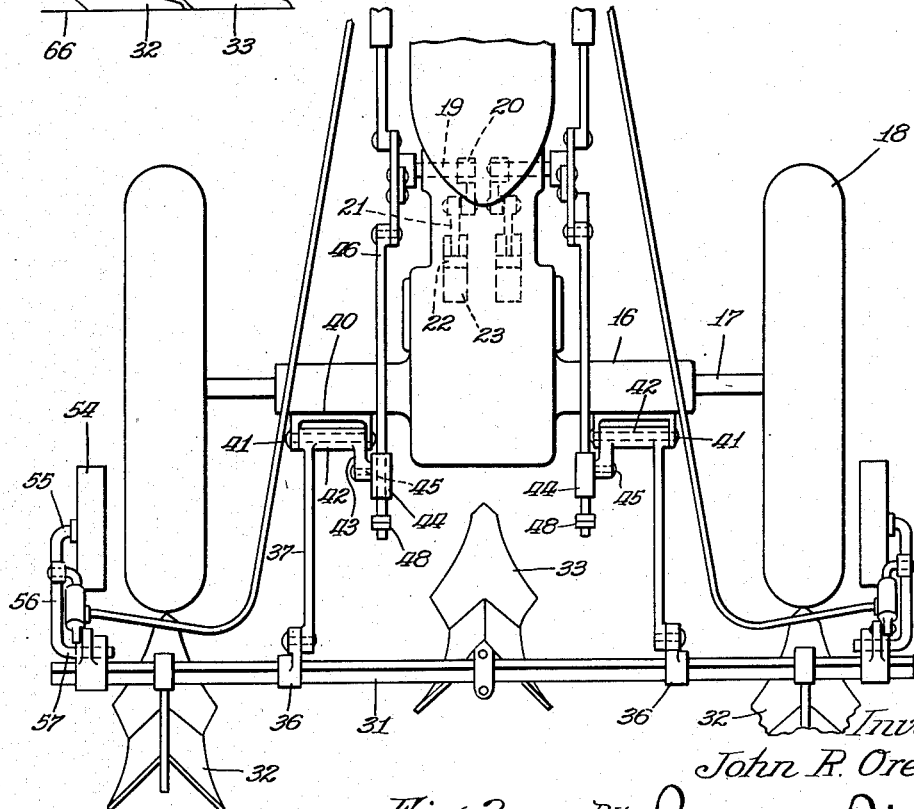
Fig. 2.
Inventor
John R. Orelind
By 
Atty.

Patented Aug. 8, 1950

2,518,363

UNITED STATES PATENT OFFICE 2,518,363

POWER LIFT DEVICE FOR IMPLEMENTS

John R. Orelind, Wilmette, Ill., assignor to International Harvester Company, a corporation of New Jersey Application October 5, 1946, Serial No. 701,580

3 Claims. (Cl. 97—50)

This invention relates to a tractor and implement combination. More specifically, it relates to a tractor-mounted implement provided with tractor power operated lifting and gauging mechanisms.

The trend in recent years has been wherever possible to attach implements directly to a tractor. In making this type of implements difficulties have been encountered in providing suitable gauge means, as the position of the ground is not always a proper indication to determine the working position of the implement. It has therefore been necessary to provide independent gauge means for the implement.

A principal object of the present invention is to provide improved and simplified gauge means for an implement directly connected to a tractor along with lifting means, both being operated by a single power-lift structure on the tractor.

Another important object is the provision of two sets of gauge means at laterally spaced positions for an implement extending transversely across the tractor.

Another specific object is to provide a rockable power lift arm with connecting linkages for performing two independent operations with one being substantially ineffective while the other is being operated to perform its function.

The above objects and others which will be apparent from the detailed description to follow are attained by a construction such as shown in the drawings in which:

Figure 1 is an elevation of a tractor and implement combination with the rear axle structure of the tractor broken away in section at one side to remove the wheel and better show the implement connecting linkage; and Fig. 2 is a plan view of the rear portion of the tractor and the implement shown in Figure 1.

The drawings show a conventional tricycle tractor having a narrow body 10, a hood and radiator structure 11, a front wheel bolster 12, a steerable front wheel 13, a steering shaft 14, a column 15 for supporting a steering shaft, laterally extending rear axle housings 16, drive axles 17 and traction wheels 18. As shown, the tractor is provided with two laterally extending rockable power-lift shafts 19 projecting laterally from the body 10 of the tractor. As indicated diagrammatically and in dotted lines, an operating mechanism is shown for oscillating the shaft 19. Each shaft is shown as being provided with a crank arm 20 connected to a piston rod 21 of a piston 22 reciprocable in a cylinder 23. Any well known power actuated mechanism may be utilized for rocking the shaft 19 at the will of the operator by means of small levers 24 pivotally mounted on the column 15 and operable over an indexing sector 25. Rods 26, one of which is visible, are shown as connecting the lower ends of the levers 24 to the power-lift mechanism within the tractor body 10.

Each of the shafts 19 is provided with a lifting arm 27 provided with an extended end portion 28 which is connected as illustrated by two pins 29 with an arcuate member 30 which is formed on a radius about the axis of the shaft 19 and projects a substantial angular direction to each side of the arm 27.

The drawings illustrate an implement extending entirely across the rear of the tractor, said implement consisting essentially of a transverse tool bar 31, a pair of lister plows 32 arranged back of the traction wheels 18 and a centrally positioned lister plow 33. Said plows are mounted respectively on beams 34 and 35 which are rigidly connected to the tool bar 31 by suitable clamping means. A pair of laterally spaced upstanding brackets 36 provide means for flexibly connecting the implement to the tractor by means of a substantially parallel linkage. Said linkage includes a pair of arms 37 pivotally connected to the upper ends of the brackets 36 by pins 38 and a pair of links 39 pivotally connected at the lower ends of the brackets 36. A pair of bracket structures 40 are rigidly connected to the axle housings 16. At their lower ends said bracket structures 40 provide means for pivotally connecting the links 39. At their upper ends said brackets carry pins 41 on which sleeves 42 are rotatably mounted. The arms 37 are rigidly connected to the sleeves 42 and upstanding crank arms 43 are also rigidly carried by said sleeves. The arms 37, the sleeves 42 and the arms 43 in effect provide bell cranks oscillatable about the pins 41. It will be understood that the connections at the pins 38 and the pivotal connections at both ends of the links 39 are sufficiently free to provide flexing of the implement about a longitudinal axis sufficiently to permit the implement to follow the contour of the ground and to provide for independent adjustment of each end of the implement as will be hereinafter described.

Guide members 44 are pivotally connected by pins 45 to the arms 43. Links 46 slidably extend through the guide members 44, said links being pivotally connected to the rear-most portion 47 of the arcuate member 30. The links 46 at their rear ends are provided with threaded nuts 48 which provide an adjustable stop. Compression springs 49 surrounding the links 46 abut the forward ends of the guide members 44 and stop elements 50 secured to the links 46.

At each end of the tool-bar 31 a member 51 is rigidly connected to provide a downwardly extending arm 52 and an upwardly extending arm 53. A gauge wheel 54 is rotatably carried by a stub axle end portion 55 of a gauge wheel supporting member 56. Said member is provided also with an extension 57 which forms a pivot shaft for the member, said pivot shaft being rotatably carried on a transverse axis by the member 51.

A fluid expansible device including a cylinder 58 and a piston 59 is pivotally connected to the upper end of the arm 53 and to a bracket 60 on the gauge wheel supporting member 56. Said piston and cylinder device is so arranged that its extension and contraction alters the position of the gauge wheel 54 within limits necessary to gauge an implement such as shown for all operating conditions.

A flexible conduit 61 is connected to the cylinder 58 and to a cylinder 62 pivotally connected to the tractor at 63. A piston 64 in the cylinder 62 is pivotally connected by a pin 65 with an end portion 48 of the arcuate member 30, said end portion extending in a forward direction of the tractor with respect to the lifting arm 27. It is to be understood that the conduit 61 confines a medium for transmitting pressure from the piston 59 to the piston 64 and thereby transmitting movement from the arcuate member 30 to the gauge wheel supporting member 56.

Figure 1 shows the implement in normal operating position with the gauge wheel 54 operating on the surface of the ground as indicated by the line 65. The line 66 indicates the bottom of the furrow made by the plows 32 and 33.

When it is desired to lower or raise the plows, an operator on the tractor merely operates the lever 24 to alter the position of the gauge wheels 54 relative to the respective ends of the implement. By having a pair of independently controlled devices either end of the implement may be lifted and lowered independently.

It will be noted that the pin 65 by which the piston 64 is connected to the arcuate member 30 is in such a position in Figure 1 so that the effective crank arm of the power-lift device is at substantial right angles to the line of location of the hydraulic device including the piston 64 and the cylinder 62. This arrangement in angular movement of the power-lift arm 27 is effective in giving maximum relative movement of the piston 64 relative to the cylinder 62 and therefore maximum relative movement between the cylinder 58 and the piston 59. It will also be noted in Figure 1 that the link 46 lies on a line passing through the centers of the pivot pin 47 and the axis of the lifting shaft 19. With this arrangement small angular movements of the power-lift arm 27 in either direction have little effect on the longitudinal movement of the link 46 by virtue of the lost motion beyond the end of the sleeve of the guide member 44 as shown in Figure 1. The angular movements of the power-lift arm 27 necessary to cover the range of adjustment of the gauge wheel 54 does not take up the slack in the lifting linkage including the arms 37 and the links 46. For that reason the implement flows freely when in operative position and at the same time a linkage is available by which the same power-lift mechanism which adjusts the gauge wheel may be utilized to adjust the working depth of the implement during a part of its range of movement and to lift the implement during another part of its range of movement.

It is to be understood that applicant has described one power-lift structure during most of his specification and that an identical power-lift construction is shown at each side of the tractor. In some installations only one of the power-lift devices may be used and moreover each device incorporates the basic feature of the invention of using two different ranges of movement of the power-lift arm for different functions.

Although applicant has shown and described only a preferred embodiment of his invention, it is contemplated that all modifications falling within the scope of the appended claims form portions of the invention.

What is claimed is:

1. An implement and tractor combination comprising a tractor having a rockable power lift structure thereon, said structure having connecting points arranged angularly spaced from each other, and an implement connected to the tractor for vertical movement with respect thereto, said implement being provided with ground engageable gauge means movable with respect to the implement, a piston and cylinder device connected between said gauge means and the implement whereby relative movement of the piston and cylinder alters the position of the gauge means and thereby the working depth of the implement, a second cylinder and piston device connected to the tractor and to one of the connecting points on the power lift structure, a flexible conduit connecting said cylinder and the cylinder on the device connected to the implement and the gauge means, means confined by said conduit whereby movement of one piston is transmitted to the other, a lifting linkage connected to the implement and including a link connected to the one of the connecting points of said power lift structure, said linkage including a lost motion connection whereby the implement may rise and fall during operation, its working depth being determined by the gauge means, said link being connected to the power lift structure in such a position that during working position of the implement, said link assumes a dead center position to the extent that adjustment of the power lifting device does not appreciably alter the position of the lifting linkage, the piston and cylinder device on the tractor being connected to the power lift structure at a point so as to provide a maximum movement of the gauge means upon angular movement of the power lift when the implement is in working position.

2. An implement and tractor combination comprising a tractor having two independently operable rockable power lift structures thereon, each structure having connecting points arranged angularly spaced from each other, and an implement pivotally connected to the tractor for vertical movement with respect thereto, said implement being provided with a pair of laterally spaced vertically adjustable gauge wheels, a piston and cylinder device connected between each gauge wheel and the implement whereby relative movement of the piston and cylinder alters the position of the gauge wheel relative to the implement and thereby the working depth of the implement, a pair of second cylinder and piston devices each connected to the tractor and to one of the connecting points on one of the power lift structures, a hose connecting each of said cylinders and the respective gauge wheel cylinder whereby movement of one piston is transmitted to the other, lifting linkage mounted on the tractor and connected to the implement and to one of the power lift structures, said linkage assuming in the working position of the implement a dead center position with respect to the axis of the rockable power lift structure and including lost motion connections whereby the implement may rise and fall during operation, its working depth being determined by the gauge wheels, the pistons of the piston and cylinder devices on the tractor being so connected to the power lift structures that when the implement is in working position small angular movements of the power lift arms are effective to actuate the gauge wheels and to thereby adjust the working depth of the implement.

3. An implement and tractor combination comprising a tractor having two independently operable rockable power lift structures thereon, each structure having connecting points arranged angularly spaced from each other, and an implement pivotally connected to the tractor for vertical movement with respect thereto, said implement being provided with a pair of laterally spaced vertically adjustable gauge wheels, a piston and cylinder device connected between each gauge wheel and the implement whereby relative movement of the piston and cylinder alters the position of the gauge wheel relative to the implement and thereby the working depth of the implement, a pair of second cylinder and piston devices each connected to the tractor and to one of the connecting points on one of the power lift structures, a hose connecting each of said cylinders and the respective gauge wheel cylinder whereby movement of one piston is transmitted to the other, lifting linkages mounted on the tractor and connected at spaced points to the implement and to connecting points on the power lift structures, said linkages including lost motion connections whereby the implement may rise and fall during operation, its working depth being determined by the gauge wheels, said linkages being connected to the power lift arms in such angular positions that during working position of the implement, each lifting link assumes a dead center position with respect to the axis of the rockable power lift structure to the extent that adjustment of the power lifting structures does not appreciably alter the position of the lifting linkages, the pistons of the piston and cylinder devices on the tractor being so connected to the power lift structures that when the implement is in working position small angular movements of the power lift arms are effective to actuate the gauge wheels and to thereby adjust the working depth of the implement.

JOHN R. ORELIND.

REFERENCES CITED

The following references are of record in the file of this patent:

UNITED STATES PATENTS

| Number | Name | Date |
| --- | --- | --- |
| 2,144,347 | Silver | Jan. 17, 1939 |
| 2,172,983 | Morkoski | Sept. 12, 1939 |
| 2,222,115 | Mott | Nov. 19, 1940 |
| 2,357,848 | Ray | Sept. 12, 1944 |
| 2,410,918 | Acton | Nov. 12, 1946 |
| 2,410,945 | Johnson et al. | Nov. 12, 1946 |